United States Patent [19]

Unternahrer et al.

[11] Patent Number: 5,935,467
[45] Date of Patent: Aug. 10, 1999

[54] OVEN FOR HEATING A CRYSTAL FOR A LASER FREQUENCY CONVERSION

[75] Inventors: Josef Robert Unternahrer, Niskayuna; Mark Jon Kukla, Ballston Spa; John Leo August, Jr., Schenectady; William Taylor Lotshaw, Niskayuna, all of N.Y.

[73] Assignee: General Electric Company, Schenectady, N.Y.

[21] Appl. No.: 08/856,378

[22] Filed: May 14, 1997

[51] Int. Cl.⁶ ........................................................ H03F 7/00
[52] U.S. Cl. .......................... 219/390; 219/385; 359/328; 372/34
[58] Field of Search ..................... 219/390, 385, 219/386, 210, 200, 618, 672; 372/21, 22, 34, 36, 92, 98; 359/326, 328

[56] References Cited

U.S. PATENT DOCUMENTS

| | | |
|---|---|---|
| 4,019,159 | 4/1977 | Hon et al. ................................. 372/22 |
| 4,968,121 | 11/1990 | Bruesselbach et al. ................. 359/328 |
| 5,144,632 | 9/1992 | Thonn ........................................ 372/34 |
| 5,166,943 | 11/1992 | Dixon et al. .............................. 372/21 |
| 5,325,229 | 6/1994 | Millard ..................................... 359/330 |
| 5,353,292 | 10/1994 | Motegi ..................................... 359/326 |
| 5,363,391 | 11/1994 | Matthews et al. ......................... 372/36 |
| 5,588,014 | 12/1996 | Okazaki et al. ........................... 372/22 |

*Primary Examiner*—Jospeh Pelham
*Attorney, Agent, or Firm*—Donald S. Ingraham; Douglas E. Stoner

[57] ABSTRACT

An oven for heating a crystal for nonlinear frequency conversion of a laser beam. A grasping device resiliently grasps together the first and second sides of the crystal while allowing for generally unrestricted thermal expansion of the crystal. A heater element and a temperature sensor are each supported by the grasping device and are each in thermal contact with the crystal. A temperature controller is connected to the heater element and the temperature sensor.

16 Claims, 4 Drawing Sheets

OVEN FOR HEATING A CRYSTAL FOR A LASER FREQUENCY CONVERSION

FIELD OF THE INVENTION

The present invention relates generally to lasers, and more particularly to an oven for heating a crystal used for nonlinear frequency conversion of a laser beam.

BACKGROUND OF THE INVENTION

Use of a crystal for nonlinear frequency conversion of a laser beam is well known. Common crystals used for this purpose include LBO (lithium triborate) and KTP (potassium titanylphosphate) having the shape of a rectangular parallelepiped. In one known application, infrared laser light having a wavelength of about one micron enters the crystal and green laser light having a wavelength of about five hundred nanometers exits the crystal. The harmonic-generation performance of the crystal depends on its temperature, and typically the crystal is heated to a constant temperature of up to generally 200 degrees Celsius. A known stand-alone oven design supports the crystal by rigidly pressing the crystal against one temperature-controlled surface.

SUMMARY OF THE INVENTION

The oven of the invention is an oven for heating a crystal for nonlinear frequency conversion of a laser beam. The crystal has a lengthwise axis and a generally rectangular cross section perpendicular to the lengthwise axis, wherein the cross section has opposing first and second sides and opposing third and fourth sides. The oven includes a device for resiliently grasping together generally the entire first and second sides of the crystal while allowing generally unrestricted thermal expansion along the lengthwise axis, along a first perpendicular axis which is generally orthogonal to the first and second sides of the crystal, and along a second perpendicular axis which is generally orthogonal to the third and fourth sides of the crystal. The grasping device is attachable to an optical mirror mount. The oven also includes a heater element supported by the grasping device and in thermal contact with the crystal, a temperature sensor supported by the grasping device and in thermal contact with the crystal, and a temperature controller having an input connected to the temperature sensor and having an output connected to the heater element.

Several benefits and advantages are derived from the invention. The grasping device resiliently grasps the crystal allowing for unrestricted thermal growth which avoids mechanical stress and crystal fracture that could otherwise occur during high-average-power laser operations, especially when the crystal itself generates heat. Heating the crystal through two opposing faces gives a more uniform temperature distribution. The resilient mounting of the crystal also minimizes the risk of damaging the crystal when installing the crystal in the oven.

DETAILED DESCRIPTION OF THE INVENTION

Figure 3:
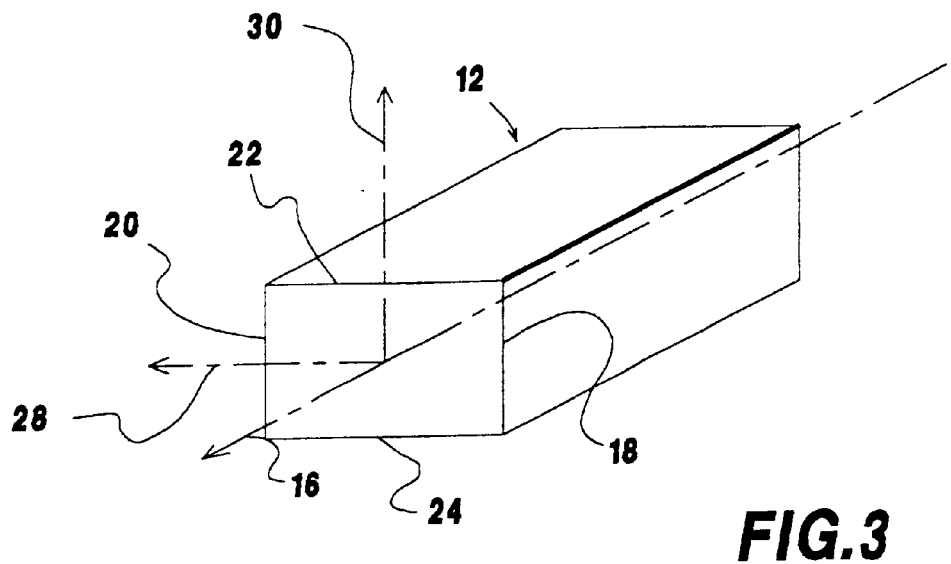
FIG. 3 is a perspective view of the crystal shown in cross section in FIG. 2.
Figure 1:
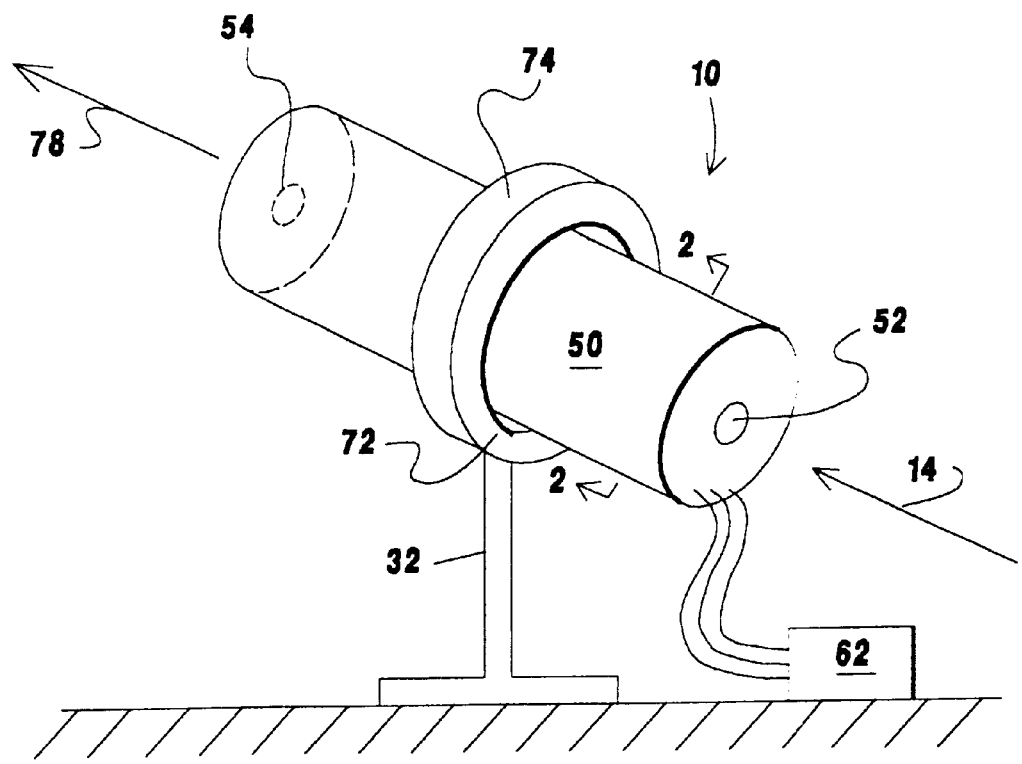
FIG. 1 is a schematic perspective view of a first preferred embodiment of the oven of the invention.
Figure 2:
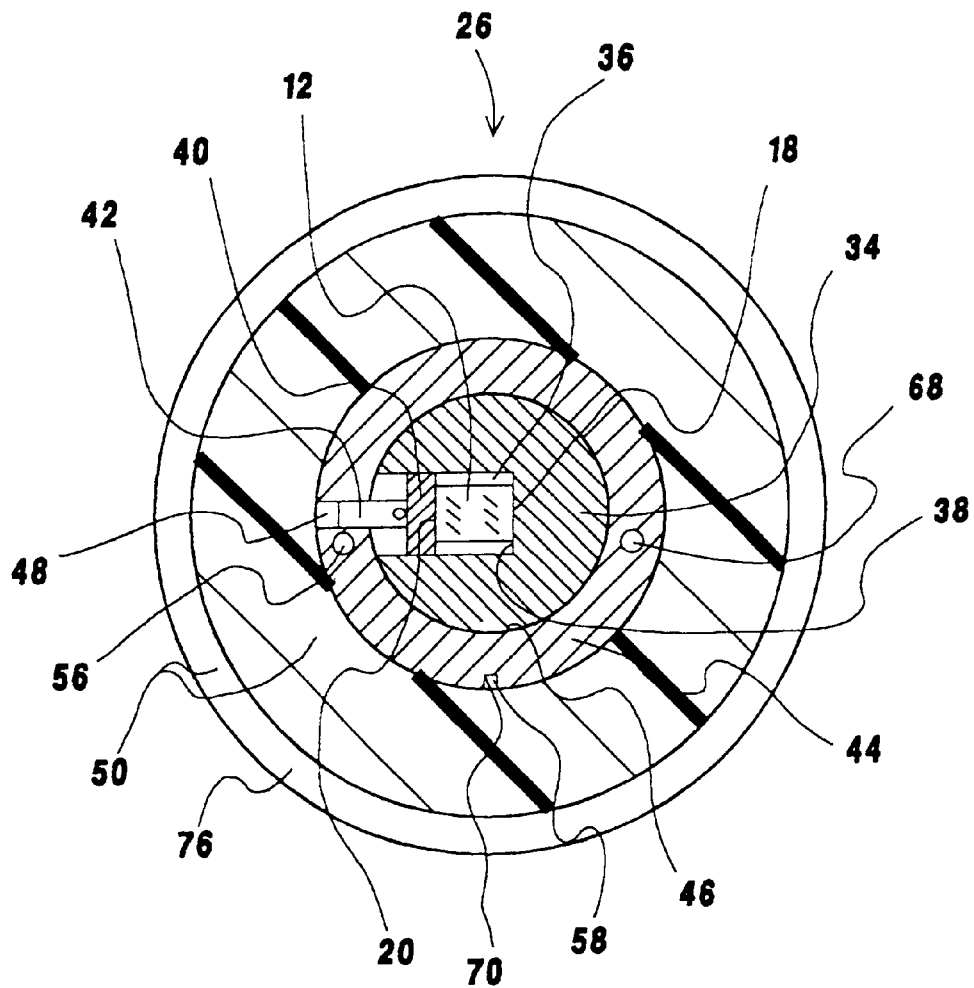
FIG. 2 is a cross-sectional view taken along lines 2—2 of FIG. 1.
Figure 4:
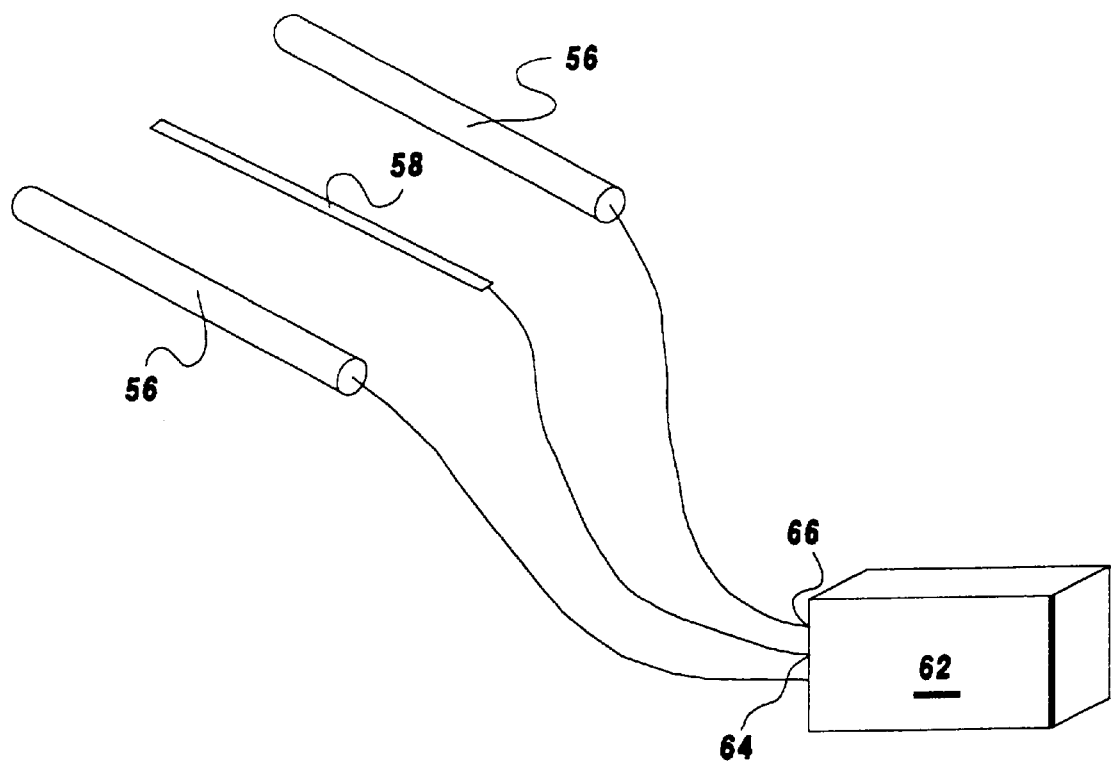
FIG. 4 is a perspective view of the temperature regulating portion of the oven of FIGS. 1 and 2.

Referring now to the drawings, FIGS. 1–4 show a first preferred embodiment of the oven 10 of the present invention. The oven 10 is for heating a crystal 12 for nonlinear frequency conversion of a laser beam 14. Preferably, the crystal 12 consists essentially of LBO (lithium triborate), KTP (potassium titanylphosphate), or any temperature phase-matched nonlinear material. The crystal 12 has a lengthwise axis 16 and a generally rectangular cross section perpendicular to the lengthwise axis 16. The cross section has opposing first and second sides 18 and 20 and opposing third and fourth sides 22 and 24. The oven includes means 26 for resiliently grasping together generally the entire first and second sides 18 and 20 of the crystal 12 while allowing generally unrestricted thermal expansion of the crystal 12 along the lengthwise axis 16, along a first perpendicular axis 28 which is generally orthogonal to the first and second sides 18 and 20 of the crystal 12, and along a second perpendicular axis 30 which is generally orthogonal to the third and fourth sides 22 and 24 of the crystal 12. The grasping means 26 is attachable to an optical mirror mount 32.

Preferably, the grasping means 26 includes an inner cylinder 34 having a longitudinal axis generally aligned with the lengthwise axis 16 of the crystal 12 and having a generally longitudinally extending notch 36 with a bottom 38. The grasping means 26 further includes a cover plate 40 engaged in the notch 36, wherein the crystal 12 is disposed in the notch 36 between the bottom 38 of the notch 36 and the cover plate 40 with the bottom 38 of the notch 36 in physical contact with generally the entire first side 18 of the crystal 12 and with the cover plate 40 in physical contact with generally the entire second side 20 of the crystal 12. The grasping means 26 also includes a ball-plunger screw 42 (such as a miniature ball plunger from the Reid Tool Supply Catalog #W-22) which has a spring loaded ball on the end of an externally threaded set screw. The grasping means 26 further includes an outer cylinder 44 having a bore 46 generally coaxially aligned with the longitudinal axis of the inner cylinder 34 and having a radially extending, internally threaded hole 48. The inner cylinder 34 and the cover plate 40 are disposed in the bore 46 with the cover plate 40 aligned with the hole 48. The inner cylinder 34 is in circumferential thermal contact with the outer cylinder 44. The ball-plunger screw 42 is threadably engaged in the hole 48 and resiliently contacts the cover plate 40. The grasping means 26 additionally includes an annular, heat-insulative cylinder 50 surrounding and attached to the outer cylinder 44 wherein the heat-insulative cylinder is insertable in and attachable to the optical mirror mount 32 and wherein the heat-insulative cylinder 50 has two opposing optical windows 52 and 54 longitudinally bounding the outer cylinder 44. The optical windows 52 and 54 isolate the crystal 12 from unwanted dust, from unwanted thermal air currents, and from unwanted humidity and/or chemical contaminants. The optical windows 52 and 54 are longitudinally spaced apart from the crystal 12 a sufficient distance to avoid problems associated with high beam intensity, as can be appreciated by those skilled in the art. In a preferred construction, the inner cylinder 34, the cover plate 40, and the outer cylinder 44 each consist essentially of the same thermally conductive material such as aluminum, brass, or copper and the heat-insulative cylinder 50 consists essentially of polytetrafluoroethylene. It is noted that this provides good thermal contact between the outer cylinder 44 (containing heater elements and temperature sensors as discussed below) and the crystal 12, and good thermal isolation of the surrounding heat-insulative cylinder 50 from the environment. The grasping means 26, as can be appreciated by those skilled in the art, allows for rapid replacement of the crystal 12 when a different laser application calls for a different crystal to be used in the oven 10. This is in addition to its basic function of being in thermal contact with and resiliently grasping the crystal 12 while allowing for thermal expansion of the crystal 12.

The oven 10 also includes one or more heater elements 56 and one or more temperature sensors 58 each supported by the grasping means 26 and each in thermal contact with the crystal 12. The oven 10 further includes a temperature controller 62 having an input 64 connected to the temperature sensor 58 and an output 66 connected to the heater element 56. The heater element(s) 56, the temperature sensor(s) 58, and the temperature controller 66 taken together form the temperature regulating portion of the oven 10 which sets and controls the temperature of the crystal 12. The temperature regulating portion of the oven 10 is a commercially available item, and a preferred temperature regulator is supplied by OMEGA Engineering, Inc. of Stamford, Conn. In one design, the temperature controller 62 is interfaced with a master computer (not shown). Preferably, the outer cylinder 44 has a longitudinally extending first channel 68, and a heater element 56 is disposed in the first channel 68. Additional first channels 68 would be provided for additional heater elements 56. The position of the heater elements with respect to the crystal will determine the uniformity of the steady-state temperature distribution and could be controlled to optimize crystal performance. Preferably, the outer cylinder 44 has a longitudinally extending second channel 70, and a temperature sensor 58 is disposed in the second channel 70. Additional second channels 70 would be provided for additional temperature sensors 58. In an exemplary construction, the heater element 56 is a resistive heating element, and the temperature sensor 58 is a thermocouple.

In a preferred construction, the bore 46 of the outer cylinder 44 is coaxially aligned with a roll axis of an orthogonal coordinate system also having pitch and yaw axes. Preferably, the roll axis is aligned with the lengthwise axis 16 of the crystal 12, the pitch axis is aligned with the first perpendicular axis 28, and the yaw axis is aligned with the second perpendicular axis 30. It is also preferred that the optical mirror mount 32 is alignable along the pitch and yaw axes. Fine alignment of the roll axis rotation can be obtained by attaching the mirror mount 32 to a goniometric cradle (not shown). Typically the optical mirror mount 32 is a standardized, 2-inch-diameter, commercially available item which enables precise alignment of an optical element mounted therein, wherein a mounting cover ring 72 threadably engages a mounting base ring 74. The grasping means 26 is attached to the optical mirror mount 32 by providing the heat-insulative cylinder 50 with a flange 76 and by disposing the flange 76 of the heat-insulative cylinder 50 between the mounting base ring 74 and the mounting cover ring 72.

In operation, the grasping means 26 holds the crystal 12 while allowing for generally unrestricted thermal expansion along the lengthwise axis 16, the first perpendicular axis 28, and the second perpendicular axis 30. The temperature regulating portion (56, 58, and 62) of the oven 10 sets and maintains the crystal 12 at a constant elevated temperature.

The laser beam 14 entering the oven 10 will have its frequency converted by the crystal 12. For example, in a frequency-doubling application, an infrared laser beam 14 will enter the oven 10, and a green laser beam 78 will exit the oven 10.

Figure 5:
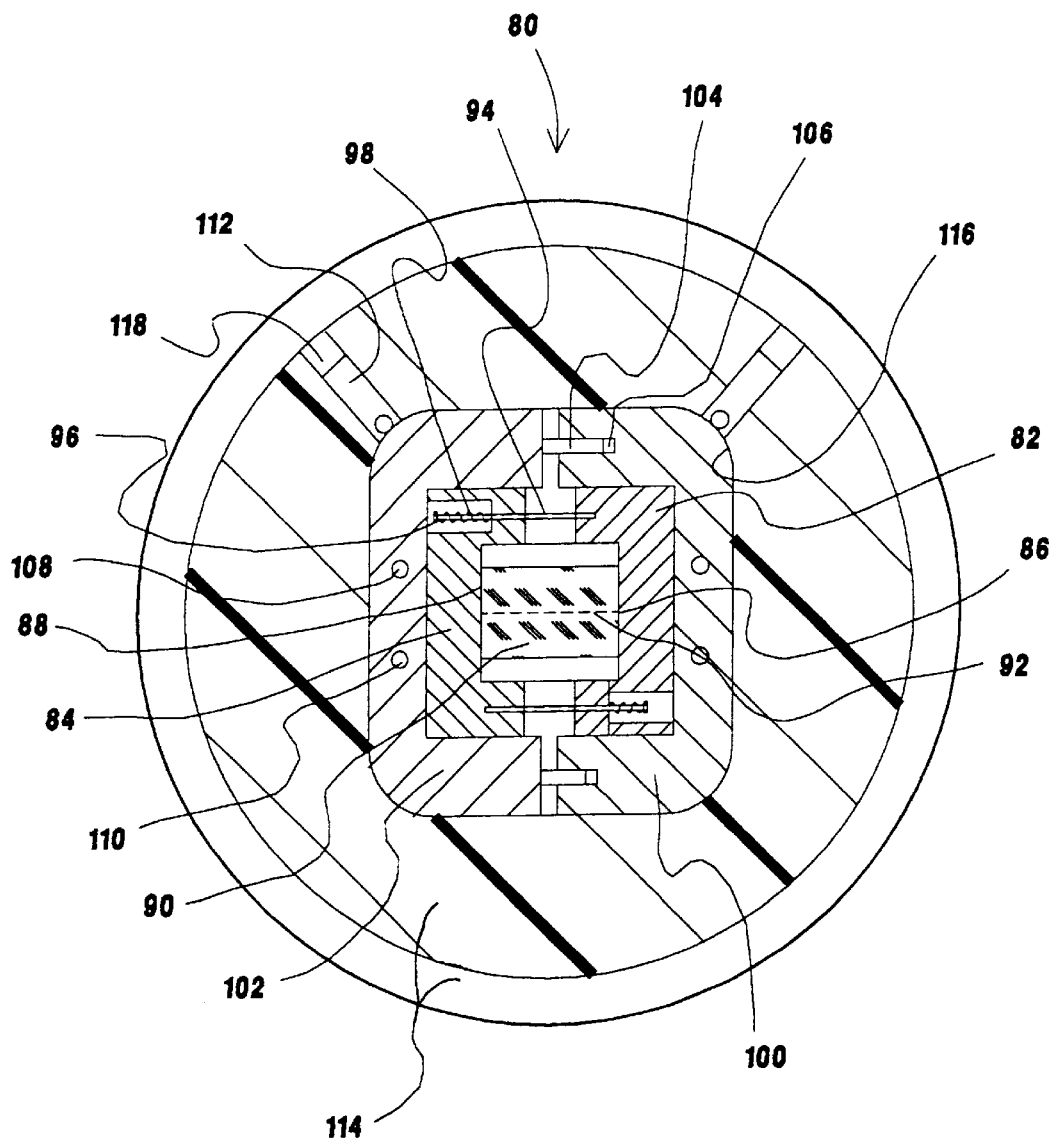
FIG. 5 is a view, as in FIG. 2, but of a second preferred embodiment of the grasping device of the oven of the invention.

Referring again to the drawings, FIG. 5 shows a second preferred embodiment of the grasping means 80 of the present invention which is different from the first preferred embodiment of the grasping means 26 previously discussed. Both embodiments of the grasping means 80 and 26 are means for resiliently grasping together generally the entire first and second sides of the crystal while allowing generally unrestricted thermal expansion of i:he crystal along the lengthwise axis of the crystal, along a first perpendicular axis which is generally orthogonal to the first and second sides of the crystal, and along a second perpendicular axis which is generally orthogonal to the third and fourth sides of the crystal, and wherein the grasping means is attachable to an optical mirror mount. In the second preferred embodiment, the grasping means 80 includes a pair of opposing, connected together, cylindrically-C-shaped clamps 82 and 84, wherein the clamps 82 and 84 abuttingly surround generally the entire first and second sides 86 and 88 of the crystal 90 and wherein the clamps 82 and 84 are spring biased to attract each other along a first perpendicular axis 92 which is generally orthogonal to the first and second sides 86 and 88 of the crystal 90. Preferably, the clamps 82 and 84 are connected together by a bolt 94 having a head 96 and wherein the clamps are spring biased to attract each other by a coil spring 98 surrounding the bolt 94 and disposed to push against the head 96 and the nearer one of the clamps 82 and 84. It is preferred that each crystal 90 have its own clamps 82 and 84 to avoid handling unprotected crystals during crystal replacement in the oven 10.

Preferably, the grasping means 80 also includes a pair of opposing, cylindrically-C-shaped housing portions 100 and 102, wherein the housing portions 100 and 102 abuttingly surround, and are in circumferential thermal contact with, the clamps 82 and 84. The housing portions 100 and 102 are slidingly engageable with each other along the first perpendicular axis 92. In an exemplary construction, the housing portions 100 and 102 are slidingly engageable with each other by a dowel 104 and corresponding dowel hole 106 arrangement. The housing portions 100 and 102 each contain a first channel 108 for insertion of a heater element (such as the heater element 56 shown in FIG. 4) and a second channel 110 for insertion of a temperature sensor (such as the temperature sensor 58). In an exemplary construction, one of the contact faces between the clamps 82 and 84 and the housing portions 100 and 102 has a key (not shown) to prevent incorrect assembly of these parts.

It is preferred that the grasping means 80 further include a ball-plunger screw 112 and a heat-insulative annular cylinder 114, wherein the cylinder 114 has a bore 116 with a longitudinal axis generally aligned with the lengthwise axis of the crystal 90. The housing portions 100 and 102 are disposed within the bore 116, the cylinder 114 has a radially extending, internally threaded hole 118, and the ball-plunger screw 112 is threadably engaged in the hole 118 and resiliently contacts one of the housing portions 100 and 102. To isolate the crystal from unwanted dust, thermal air currents, ambient humidity, and chemical contamination, the cylinder 114 has two opposing optical windows longitudinally bounding the housing portions 100 and 102 in a design generally identical to the optical windows 52 and 54 of cylinder 50 shown in FIG. 1. The cylinder 114 is insertable in and attachable to the optical mirror mount 32 in a manner generally identical to that previously discussed for cylinder 50 of grasping means 26. In a preferred construction, the clamps 82 and 84 and the housing portions 100 and 102 each consist essentially of the same thermally conductive material such as copper, and the heat-insulative annular cylinder 114 consists essentially of polytetrafluoroethylene. It is noted that this provides good thermal contact between the housing portions 100 and 102 (containing the heater elements and temperature sensors) and the crystal 90, and good thermal isolation of the surrounding heat-insulative annular cylinder 114 from the environment. The grasping means 80, as can be appreciated by those skilled in the art, allows for symmetrical heating of the crystal 90, such even heating being required for efficient frequency conversion of the laser beam. This is in addition to its basic function of being in thermal contact with and resiliently grasping the crystal 90 while allowing for thermal expansion of the crystal 90.

Other grasping means for resiliently grasping together generally the entire first and second sides of the crystal while allowing generally unrestricted thermal expansion of the crystal along the lengthwise axis of the crystal, along a first perpendicular axis which is generally orthogonal to the first and second sides of the crystal, and along a second perpendicular axis which is generally orthogonal to the third and fourth sides of the crystal, and wherein the grasping means is attachable to an optical mirror mount, include resiliently biasing two opposing crystal-holding members together by using other various push or pull mechanical spring arrangements, by using a compressed gas to push the members together or a vacuum to pull the members together, by using elastomeric materials behind one member to push it towards the other member or by connecting the members together using an elastomeric material which is under tension, and the like, as can be appreciated by the artisan.

The foregoing description of two preferred embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

We claim:

1. An oven for a crystal for nonlinear frequency conversion of a laser beam, wherein said crystal has a lengthwise axis and a generally rectangular cross section perpendicular to said lengthwise axis, wherein said cross section has opposing first and second sides and opposing third and fourth sides, and wherein said oven comprises:

a) means for resiliently grasping together generally the entire first and second sides of said crystal while allowing generally unrestricted thermal expansion of said crystal along said lengthwise axis, along a first perpendicular axis which is generally orthogonal to the first and second sides of said crystal, and along a second perpendicular axis which is generally orthogonal to the third and fourth sides of said crystal, and wherein said grasping means is attachable to an optical mirror mount;

wherein said means for grasping comprises an inner cylinder having a longitudinal axis generally aligned with said lengthwise axis of said crystal and having a generally longitudinally extending notch with a bottom, wherein said grasping means further comprises a cover plate engaged in said notch, wherein said crystal is disposed in said notch between said bottom of said notch and said cover plate with said bottom of said notch in physical contact with generally the entire first side of said crystal and with said cover plate in physical contact with generally the entire second side of said crystal;

said means for grasping further comprises a ball-plunger screw and an outer cylinder having a bore generally coaxially aligned with said longitudinal axis and having a radially extending, internally threaded hole, wherein said inner cylinder and said cover plate are disposed in said bore with said cover plate aligned with said hole, and wherein said ball-plunger screw is threadably engaged in said hole and resiliently contacts said cover plate;

b) a heater element supported by said grasping means and in thermal contact with said crystal;

c) a temperature sensor supported by said grasping means and in thermal contact with said crystal; and d) a temperature controller having an input connected to said temperature sensor and having an output connected to said heater element.

2. The oven of claim 1, wherein said grasping means additionally includes an annular, heat-insulative cylinder surrounding and attached to said outer cylinder, said heat-insulative cylinder insertable in and attachable to said optical mirror mount, and said heat-insulative cylinder having two opposing optical windows longitudinally bounding said outer cylinder.

3. The oven of claim 2, wherein said inner cylinder and said outer cylinder consist essentially of aluminum.

4. The oven of claim 2, wherein said inner cylinder and said outer cylinder consist essentially of brass.

5. The oven of claim 2, wherein said heat-insulative cylinder consists essentially of polytetrafluoroethylene.

6. The oven of claim 2, wherein said outer cylinder has a longitudinally extending first channel, and wherein said heater element is disposed in said first channel.

7. The oven of claim 6, wherein said outer cylinder has a longitudinally extending second channel, and wherein said temperature sensor is disposed in said second channel.

8. The oven of claim 2, wherein said bore is aligned with a roll axis of an orthogonal coordinate system also having pitch and yaw axes, and wherein said optical mirror mount is alignable along said pitch and yaw axes.

9. An oven for a crystal for nonlinear frequency conversion of a laser beam, wherein said crystal has a lengthwise axis and a generally rectangular cross section perpendicular to said lengthwise axis, wherein said cross section has opposing first and second sides and opposing third and fourth sides, and wherein said oven comprises:

a) means for resiliently grasping together generally the entire first and second sides of said crystal while allowing generally unrestricted thermal expansion of said crystal along said lengthwise axis, along a first perpendicular axis which is generally orthogonal to the first and second sides of said crystal, and along a second perpendicular axis which is generally orthogonal to the third and fourth sides of said crystal, and wherein said grasping means is attachable to an optical mirror mount;

wherein said means for grasping comprises a pair of opposing, connected together, cylindrically-C-shaped clamps, wherein said clamps abuttingly surround generally the entire first and second sides of said crystal and wherein said clamps are spring biased to attract each other along a first perpendicular axis which is generally orthogonal to the first and second sides of said crystal;

said means for grasping further comprises a pair of opposing, cylindrically-C-shaped housing portions, wherein said housing portions abuttingly surround said clamps and wherein said housing portions are slidingly engageable with each other along said first perpendicular axis;

b) a heater element supported by said grasping means and in thermal contact with said crystal;

c) a temperature sensor supported by said grasping means and in thermal contact with said crystal; and d) a temperature controller having an input connected to said temperature sensor and having an output connected to said heater element.

10. The oven of claim 9, wherein said clamps are connected together by a bolt having a head and wherein said clamps are spring biased to attract each other by a coil spring surrounding said bolt and disposed to push against said head and the nearer one of said clamps.

11. The oven of claim 9, wherein said housing portions are slidingly engageable with each other by a dowel and corresponding dowel hole arrangement.

12. The oven of claim 9, wherein said grasping means further includes a ball-plunger screw and a heat-insulative annular cylinder, wherein said cylinder has a bore with a longitudinal axis generally aligned with said lengthwise axis, wherein said housing portions are disposed within said bore, wherein said cylinder has a radially extending, internally threaded hole, and wherein said ball-plunger screw is threadably engaged in said hole and resiliently contacts one of said housing portions.

13. The oven of claim 12, wherein said cylinder has two opposing optical windows longitudinally bounding said housing portions.

14. The oven of claim 13, wherein said cylinder is insertable in and attachable to said optical mirror mount.

15. The oven of claim 9, wherein said clamps and said housing portions consist essentially of copper.

16. The oven of claim 9, wherein said cylinder consists essentially of polytetrafluoroethylene.

\* \* \* \* \*